(12) United States Patent
Mehr et al.

(10) Patent No.: US 10,989,275 B2
(45) Date of Patent: Apr. 27, 2021

(54) CORD HOOK AND COVERING SYSTEM FOR A TRAMPOLINE

(71) Applicant: Angehrn AG Umformtechnik, Degersheim (CH)

(72) Inventors: Christian Mehr, Kirchberg (CH); Erwin Bisang, Huenenberg (CH)

(73) Assignee: Angehrn AG Umformtechnik, Degersheim (CH)

( * ) Notice: Subject to any disclaimer, the term of this patent is extended or adjusted under 35 U.S.C. 154(b) by 28 days.

(21) Appl. No.: 16/098,376

(22) PCT Filed: May 2, 2017

(86) PCT No.: PCT/EP2017/060381
§ 371 (c)(1),
(2) Date: Nov. 1, 2018

(87) PCT Pub. No.: WO2017/191113
PCT Pub. Date: Nov. 9, 2017

(65) Prior Publication Data
US 2019/0154115 A1    May 23, 2019

(30) Foreign Application Priority Data

May 2, 2016 (EP) ..................................... 16167861
May 2, 2016 (EP) ..................................... 16167862

(51) Int. Cl.
*F16G 11/12* (2006.01)
*A63B 5/11* (2006.01)
*A63B 21/055* (2006.01)

(52) U.S. Cl.
CPC ................ *F16G 11/12* (2013.01); *A63B 5/11* (2013.01); *A63B 21/0555* (2013.01); *A63B 21/0552* (2013.01)

(58) Field of Classification Search
CPC ............ A63B 21/0552; A63B 21/0555; A63B 21/0557; A63B 71/0054; A63B 5/11;
(Continued)

(56) References Cited

U.S. PATENT DOCUMENTS 2,916,746 A    12/1959 Pease
3,238,585 A *  3/1966 Froyd ..................... F16G 11/14
                                                24/129 B
(Continued)

FOREIGN PATENT DOCUMENTS

EP    2 540 352 A1    1/2013
WO    WO 03/059462 A1    7/2003

OTHER PUBLICATIONS

Written Opinion of the International Searching Authority of International Application No. PCT/EP2017/060381 dated Jul. 19, 2017 and English Translation, 12 pages.
(Continued)

*Primary Examiner* — Garrett K Atkinson
*Assistant Examiner* — Zachary T Moore
(74) *Attorney, Agent, or Firm* — Fay Sharpe LLP

(57) ABSTRACT

A cord hook is shown for a cord ring of a trampoline covering, which cord ring has at least one connection point. The cord hook includes a distal receiving section and a proximal securing section for securing to a jump mat. The receiving section and the securing section are connected by a transition section. At least one receiving space is formed for mounting a first end and a second end of the cord ring. The cord hook also includes a fastening device.

15 Claims, 6 Drawing Sheets

(58) Field of Classification Search
CPC ........ F16B 5/06; F16B 5/0685; F16B 5/0692; F16B 45/00; F16B 45/04; F16B 45/06; F16G 11/14
See application file for complete search history.

(56) References Cited

U.S. PATENT DOCUMENTS

| | | | | |
|---|---|---|---|---|
| 6,006,405 | A * | 12/1999 | Chou | F16G 11/143 |
| | | | | 24/129 C |
| 6,685,662 | B1 | 2/2004 | Curry et al. | |
| 9,254,407 | B2 * | 2/2016 | Savarino | A63B 21/0557 |
| 9,289,637 | B2 * | 3/2016 | Publicover | A63B 5/11 |
| 2003/0223808 | A1 * | 12/2003 | Kuo | A63B 21/1609 |
| | | | | 403/220 |
| 2010/0009812 | A1 * | 1/2010 | Pieper Genannt Schmauck | A63B 5/11 |
| | | | | 482/27 |
| 2013/0316876 | A1 * | 11/2013 | Publicover | A63B 5/11 |
| | | | | 482/27 |
| 2016/0271436 | A1 * | 9/2016 | Heymans | A63B 5/11 |
| 2016/0296782 | A1 * | 10/2016 | Dai | A63B 21/0557 |
| 2016/0310774 | A1 * | 10/2016 | Publicover | A63B 5/11 |

OTHER PUBLICATIONS

International Search Report of International Application No. PCT/EP2017/060381 dated Jul. 19, 2017, 6 pages.

* cited by examiner

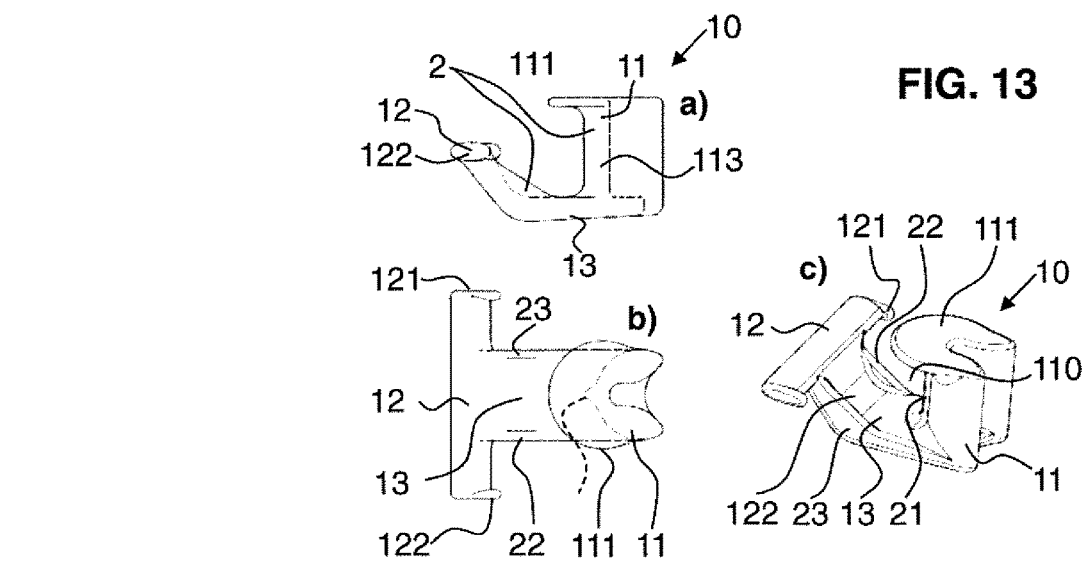
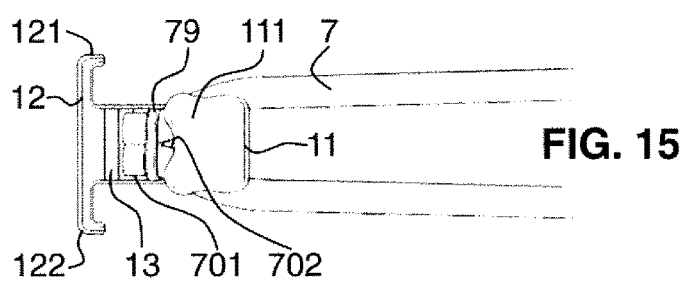
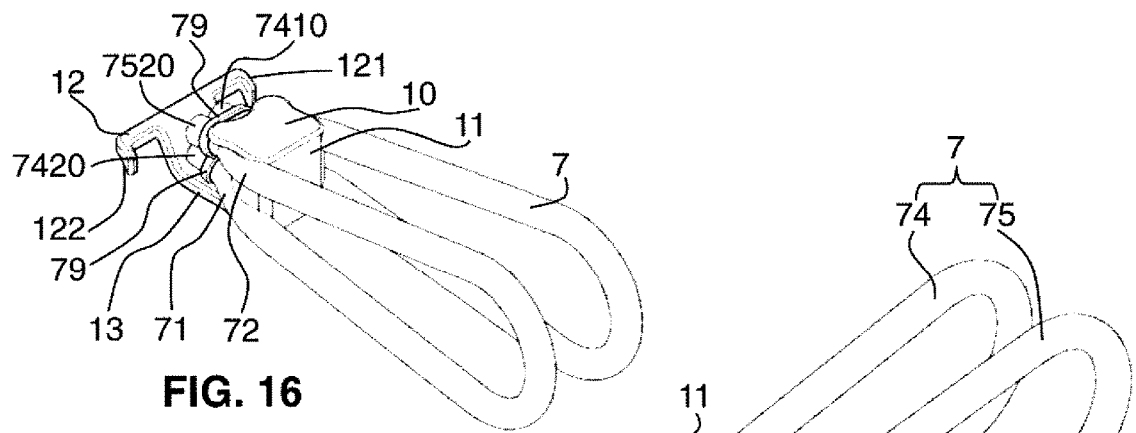
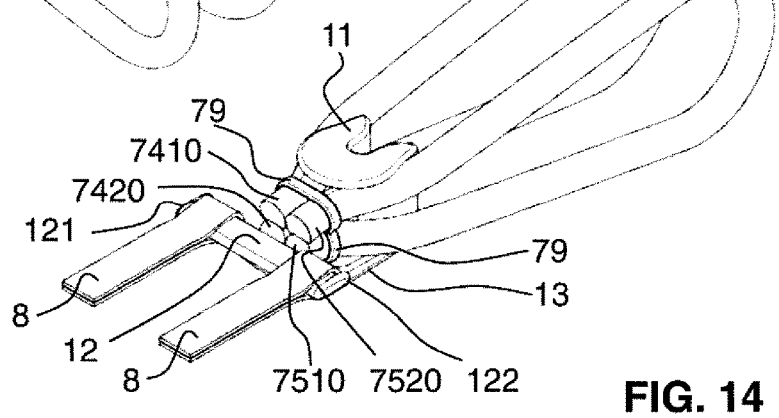
FIG. 13
FIG. 15
FIG. 16
FIG. 14

CORD HOOK AND COVERING SYSTEM FOR A TRAMPOLINE

TECHNICAL FIELD

The present invention relates to a cord hook as per the preamble of claim 1, to a cord ring for a cord hook of said type, to a securing system having a multiplicity of cord hooks and cord rings of said type, and to a method for tensioning a trampoline using such means.

PRIOR ART

The securing system for securing or tensioning a jump mat on the frame of a trampoline is determinative for the durability and in particular also the oscillation characteristics of the trampoline during use. It is correspondingly important to provide an optimum securing system. EP 2 540 352 has disclosed for example a securing system which has elastic cord rings which are secured in each case by means of a cord hook, and a band element which engages on the cord hook, to the jump mat. The cord hooks are designed as double hooks, wherein a first end of the cord ring, that is to say a portion of the cord ring, is mounted into a first receiving space of the double hook, the cord ring is looped outward and around a portion of the trampoline frame back to the cord hook, and is mounted by means of a second end of the cord ring situated within the trampoline frame into a second receiving space of said cord hook. The cord hook has a shackle which, in a tensioned position, projects inward in relation to the trampoline frame and which has a slot at the free end portion, through which slot the band element is guided. The band element is sewn by means of the opposite end to the jump mat.

The cord ring has at least one point at which the at least one cord piece which forms the ring is closed. At this connecting point, the ring typically exhibits relatively low elasticity; at any rate, the elastic characteristic of the cord ring varies there from one ring portion to another. In EP 2 540 352, said point is now generally situated in one of the tension sections of the cord ring, that is to say in one of those cord ring portions which run freely between the frame and the cord hook, whereby the tension sections of said cord ring have different elastic characteristics. This leads to asymmetrical loading of the cord ring and thus to premature wear. Furthermore, this asymmetry is disadvantageous for the oscillation characteristics of the jump mat during use.

PRESENTATION OF THE INVENTION

It is an object of the present invention to specify means which permit improved tensioning of a jump mat in a trampoline frame.

Said object is achieved by means of a cord hook having the features of claim 1. Accordingly, in a first aspect of the present invention, a cord hook for a cord ring, which has at least one connecting point, of a trampoline tensioning arrangement is proposed, wherein the cord hook comprises a distal receiving portion and a proximal securing portion for securing to a jump mat. The receiving portion and the securing portion are connected to one another by means of a transition portion. The cord hook has at least one receiving space for the mounting of a first end and of a second end of the cord ring. The cord hook may thus be designed as a single hook with exactly one receiving space for both ends of the cord ring, or as a multiple hook, in particular as a double hook, with in each case one receiving space per end of the cord ring. The above object is in this case achieved in that the cord hook furthermore has a fixing device which is designed to, during the intended use of the cord hook, hold the at least one connecting point so as to prevent slippage in a cord direction, that is to say along the cord ring.

The connecting point is thus held by the fixing device in the corresponding receiving space so as to be secured against movement in the cord direction, a lateral movement. The expression "cord direction" refers to the direction of the respective cord portion relative to the cord ring. In other words: the fixing device is designed and arranged to, when the cord hook is situated in the tensioned state during the intended use of the cord hook, hold at least one connecting point so as to prevent slippage in the circumferential direction of a portion of the jump mat to which the cord hook is secured.

Said fixing device may be arranged in the at least one receiving space and/or outside the latter. The centering, support and fixing of the connecting point in the corresponding receiving space is achieved by way of contact between the cord ring and one or more elements of the fixing device. The fixing device thus comprises one or more elements which are arranged in the at least one receiving space and/or outside the latter on the cord hook. If the cord hook has multiple receiving spaces, two receiving spaces in the case of a double hook, then elements of the fixing device may be fitted in one or several or in all receiving spaces, for example in both receiving spaces of the double hook.

The fixing device may also be referred to as centering device, which centers the connecting point in the receiving space, or as lateral guide arrangement, which supports the connecting point laterally, that is to say along the cord ring or in the circumferential direction of the jump mat portion to which the cord hook is secured, such that said connecting point is fixed in the corresponding receiving space.

The present invention is based on the realization that a cord ring can be mounted into the cord hook such that the at least one connecting point is, by means of the fixing device, fixed in the corresponding receiving space so as to be prevented from slipping laterally during use. It could also be stated that the at least one connecting point is arranged in the first end of the cord ring, and the first end of the cord ring is fixed so as to be secured against lateral movement along the cord ring in the corresponding receiving space. By means of this fixing, an optimized tensioning arrangement can be realized, in particular improved oscillation characteristics and a lengthened service life.

If for example two connecting points are now provided in the cord ring, then it is possible for one connecting point to be arranged preferably in the first end of the cord ring and for the other connecting point to be arranged in the second end of the cord ring, and it is thus possible for one or even both connecting points to be fixed by means of the fixing device. It is basically self-evidently also possible for more than two connecting points to be provided in the cord ring, though cord rings with one or two connecting points are preferred. At any rate, the advantage according to the invention is achieved already if at least one of the connecting points is fixed according to the invention in a receiving space of the cord hook so as to be secured against lateral slippage along the cord ring, that is to say in the cord direction, which prevents said connecting point from being in the tension section or moving into said tension section during use and thus giving rise to the disadvantages described above.

The slippage in the cord direction may also be referred to as lateral slippage; it can be described as a movement which results in the corresponding end in the receiving space of the cord ring in the tensioned state being formed by another section of the same cord ring—specifically that section which is moved into the receiving space. In other words: slippage or movement in the cord direction means a movement of the cord ring along that portion of the cord ring which is mounted in the cord hook. As a consequence of the fixing of the connecting point in the corresponding receiving space of the cord hook, the at least one fixed connecting point is not arranged in one of the tension sections of the tensioned cord ring, but rather is fixed in the receiving space of the cord hook. It can thus be ensured that all four tension sections of the cord ring have more similar or even identical elastic characteristics, which leads to a more symmetrical, or symmetrical, load of the cord ring and thus to less wear and improved oscillation characteristics.

The cord ring is preferably of elastic form. The cord ring is preferably a rubber cord ring.

The "proximal side" of the cord hook is thus the side at which the securing portion is arranged, the "distal side" of said cord hook is the side at which the receiving portion is arranged. Correspondingly, the "proximal direction" is the direction from the receiving portion to the securing portion; the "distal direction" is the direction opposite to the proximal direction. The lateral slippage, or in the cord direction, may also be referred to as sideward slippage, wherein the sideward direction is perpendicular to the proximal/distal direction and lies in the plane of the tensioned, unused jump mat.

In order to now tension the cord ring, this is typically stretched such that two substantially parallel cord ring portions move closer together, whereas the other two cord portions, which connect the long portions lying parallel, move apart from one another. This elongate ring is then looped around the outside of the trampoline frame, such that a portion of the trampoline frame makes contact with the cord ring centrally, and the longitudinal form of the cord ring is made into a U shape. In the context of the present application, the expression "end of the cord ring" refers to a portion of the cord ring which connects said parallel cord ring portions at an end side. In the image of the U shape, the "ends of the cord ring" are to be understood as the free ends of the U shape, the trampoline frame portion makes contact with the base of said U shape from the inside, that is to say lies between the legs of the U shape. The two ends of the cord ring are generally situated diametrically oppositely with respect to the ring.

In the context of the present application, the expression "connecting point" is to be understood to mean that portion of the cord ring at which the one or more cord pieces that form the ring are connected pairwise to one another. This connection may be configured in a variety of ways. Preferably, the connecting point may be formed by a bracket. The cord ring is formed from at least one cord piece and has at least one connecting point. If a cord ring has for example two connecting points, these are preferably arranged at diametrically oppositely situated ring portions, such that each connecting point can be arranged in an end of the cord ring for the purposes of mounting into the corresponding receiving space, and then at least one, preferably both connecting points can be secured according to the invention by means of the fixing device.

In the context of the present application, the expression "tension section" means a cord ring portion which extends freely between the cord hook and the trampoline frame.

The present invention preferably relates to a mini trampoline. Such mini trampolines are commonly offered with a diameter of 100 centimeters to 150 centimeters. The jump mat thereof is typically positioned 20 centimeters to 35 centimeters above the ground. Such apparatuses are used for achieving positive impetuses for personal health promotion, for relaxation and for physiotherapeutic exercises. The type of use may be circumscribed as rocking, swinging and light jumping. Here, the feet normally remain close to the mat plane—that is to say mini trampolines are designed for jumping heights of 10 centimeters to 40 centimeters. During normal use, there are resulting load peaks in the range from 2.5 to 3.5 times gravitational acceleration. Mini trampolines are normally used at home or in rooms. They are often set up or moved several times per day. This usage requirement gives rise to the imperative need for lightweight and nevertheless stable constructions. The weight of mini trampolines should not exceed 10 kilograms to 15 kilograms, otherwise the customer benefit is greatly restricted. Optimum benefit would necessitate that the apparatuses function practically silently, because noises divert concentration from body posture and thus lessen the preventative therapeutic benefit. It is however also possible for other trampoline types, such as for example a garden trampoline, to be improved using the means according to the invention.

The fixing device is preferably now designed such that contact is made with the cord ring in the region of the at least one connecting point on an outer side of the cord ring. The expression "in the region of the at least one connecting point" means in this case that the contact region at which the fixing device makes contact with the cord ring in the tensioned state is arranged close to the connecting point to be correspondingly fixed. This may for example mean that the contact region is remote from the connecting point by less than a diameter of the cord of the cord ring, or in other words by less than one quarter to half of a diameter of the receiving portion. In the embodiments in which the connecting point is formed by a bracket, the location of the bracket is to be understood as a connecting point, because it is there that the corresponding cord portions are clamped together. Thus, when the trampoline tensioning arrangement is in a tensioned state, the bracket may be remote from the contact region of the fixing device by less than one cord diameter, or in other words by less than one quarter to half of a diameter of the receiving portion. This contact is preferably produced from the outside in a region which, in the tensioned state, lies proximally with respect to the connecting point. In this way, an optimum lever for the fixing of the connecting point in the receiving space is provided. For example, it is possible according to the invention for the end portions of cord pieces which form the cord ring to be clamped together by means of the bracket so as to point in the same direction. After the mounting of the corresponding end of the cord ring in which this connecting point defined by the bracket is situated, these two end portions which extend from the connecting point point with their free ends from the receiving space of the cord hook in the direction of the securing portion, that is to say in the proximal direction. In this context, the expression "slippage in the cord direction" likewise means a sideward slippage; the cord direction then means the corresponding direction of the cord ring and not of the free ends pointing in the proximal direction; the movement direction of the slippage in the cord direction is in this case thus perpendicular to the free end portions, along the ring. These free ends may be contacted by at least one, preferably two or more, lateral guide elements which are of plate-like or column-like form and which engage on the cord ring from outside the latter and which project from the transition portion transversely with respect to the longitudinal extent of the free ends of the cord pieces and transversely with respect to the distal direction. The lateral guide element may also be referred to as fixing element. The lateral guide element has a corresponding cheek for making contact with the cord ring. By virtue of the fact that the fixing device engages on said end portions close to the connecting point in a supporting manner from the outside, and in this example proximally with respect to the connecting point, it is possible to realize a short construction of the cord hook. It is self-evidently also conceivable here for one or more such lateral guide elements to additionally or alternatively be arranged such that, in the installed state, they are situated distally with respect to the connecting point and make contact with the cord ring from the outside. The lateral guide element is an element which provides a cheek for making contact with the cord ring in the region of the connecting point so as to fix the connecting point in the receiving space.

Alternatively or in addition, the fixing device may make contact with the cord ring in the region of the at least one connecting point on an inner side of the cord ring. In this case, too, the expression "in the region of the at least one connecting point" is to be understood to mean that the contact region in which the fixing device makes contact with the inner side of the cord ring amounts to for example less than one cord diameter of the cord ring. For this purpose, it would on the one hand be possible for a flat guide element, which projects for example from the transition portion, to be positioned between the free ends of the above-described end portions, in particular so as to be situated proximally with respect to the bracket in the installed position. It is however additionally or alternatively also conceivable for the fixing device to realize this contact with the inner side of the cord ring on the distal side of the connecting point, at which the two end portions extend away from one another in order to run around the receiving portion. In this region, it is then for example possible for a projection to be provided which extends from the receiving portion in the proximal direction into the space between the cord portions toward the connecting point. Said projection may however additionally or alternatively also extend away from the transition portion. The fixing device may thus have for example a projection in the form of a ridge which extends in the longitudinal direction of the receiving portion (that is to say transversely with respect to the proximal direction and transversely with respect to the longitudinal extent of the securing portion) centrally on the proximal side, directed toward the securing element, of the receiving portion.

In order to give a clearer overview of the relationship of the dimensions, it is for example possible for the diameter of the receiving portion to amount to two to four cord diameters, preferably three cord diameters, of the cord ring a length of the receiving portion may be of a length approximately equal to a diameter of the receiving portion. The securing portion is situated with its longitudinal direction preferably perpendicular to, and spaced apart by means of the transition portion from, the receiving portion. Here, a longitudinal extent of the securing portion may be selected such that the securing portion projects laterally beyond the cord hook to both sides. The securing portion may thus be longer than the receiving portion is tall.

The fixing device may be regarded as a structure having one or more elements which makes contact with the cord ring in sections in the region of the connecting point and thus permits guidance and/or immobilization or fixing of the cord ring in a particular position, such that the connecting point is fixed in the tensioned state during intended use. By means of this fixing of the cord ring, it is possible to prevent the connecting point from moving into one of the tension sections, whereby the disadvantageous effect described in conjunction with the prior art, specifically the asymmetrical loading of the various tension sections, can be prevented.

An embodiment of the fixing device is particularly preferable which has at least or exactly one projection which is attached to the receiving portion and which projects into the receiving space and which is designed and arranged so as to engage into the at least one connecting point preferably from within the cord ring.

Said projection preferably projects in the direction of the transition portion from the receiving element.

Said projection is then preferably of elongate form, that is to say in the manner of a ridge, and runs along the longitudinal extent of the receiving portion in the receiving space. Here, the ridge preferably projects in the direction of the securing portion, that is to say in the proximal direction. The ridge projects from the receiving portion preferably by approximately up to one half of the cord diameter. The ridge preferably narrows in the direction of the material removal height and has a rounded free end. If a cord ring end is now mounted into the receiving portion with the ridge, wherein the end portions of the cord piece that forms the cord ring are clamped together so as to point in the same direction and the connecting point is placed over the ridge, then the projection or the ridge forces the connected cord portions somewhat apart from one another laterally, that is to say in the cord direction, in a wedge-like manner from the distal direction, engages in positively locking fashion with respect to the lateral directions into the cord ring, and thus supports or fixes the connecting point so as to prevent slippage in the cord direction, that is to say in the sideward direction.

To be able to further stabilize the connecting point or the cord ring, the stated lateral guide elements may be attached proximally proceeding from the connecting point. These lateral guide elements may be arranged in both lateral regions of the transition portion, such that the two free ends can be received between the lateral guide portions. Alternatively or in addition, it is also possible for a plate-like projection to project distally, and/or for the connecting point to project from the transition portion and to be guided between the two end portions of the cord ring, such that further lateral guidance is ensured.

The fixing device thus preferably comprises at least one lateral guide element which is attached to the transition portion, preferably to a lateral edge of the transition portion, and which makes contact with the at least one connecting point from outside the cord ring.

In certain embodiments, the fixing device may comprise two or more lateral guide elements per receiving space, which lateral guide elements enclose the at least one connecting point of the cord ring to both sides. Thus, the connecting point is held in the cord direction, that is to say in the direction of the cord ring.

In some embodiments, the cord hook is formed as an individual hook and has an individual receiving space for the joint mounting of the first end of the cord ring and second end of the cord ring. In the tensioned state, it is preferable for the individual hook to be situated so as to be downwardly open. In this way, it is for example the case that the risk of injury during use is minimized.

In a preferred embodiment, the cord hook is formed as a double hook and has a first receiving space for the mounting of the first end of the cord loop and a second receiving space for the mounting of the second end of the cord ring. Preferably, the first receiving space and the second receiving space are separated from one another by the transition portion. The transition portion and securing portion may together form a shackle, as disclosed in EP 2 540 352. Here, the shackle has with a slot for the leadthrough of a flexible band element for the purposes of securing to the jump mat. Instead of the slot, a hook element is also possible. More generally, it is self-evidently possible for the transition portion to be of straight form and to have a different securing portion.

The band element may also be referred to as a loop and may be flexible, in particular composed of at least one textile, for example a fabric, and/or at least one foil or a composite of these.

In one embodiment, the fixing device is arranged only in the first or second receiving space of the double hook, or assigned only thereto. This embodiment is particularly advantageous in conjunction with a cord ring which has only one connecting point. Specifically, it is then possible for the first end of the cord ring with the connecting point to be mounted into the one receiving space with the fixing device and secured there against movement in the cord direction. The second end of the cord ring, which does not have a connecting point, that is to say which is a through-extending cord piece, is then mounted into the second receiving space of the double hook, in which no fixing device is arranged. A fixing device in the other receiving space would, in this configuration, be unnecessary or even disruptive, because an abutment of the through-extending cord section on the ridge would lead to a locally increased pressure load on the cord, which would result in a higher load on and thus premature damage to the through-extending cord portion in the second receiving space; the attachment of lateral guide elements would be unnecessary and material-intensive without advantage. It is thus possible for basically any cord ring with at least one connecting point to be advantageously tensioned into a cord hook of said type.

In a further embodiment, the fixing device is arranged both in the first receiving space and in the second receiving space of the double hook. This embodiment is particularly advantageous with a cord ring which has two (that is to stay a first and a second) connecting points, wherein a first connecting point is arranged at the first end of the cord ring and a second connecting point is arranged at the second end of the cord ring. These first and second connecting points are situated diametrically opposite one another across the cord ring. The first connecting point is then mounted into the first receiving space with a fixing device, and is specifically fixed there by means of said fixing device, and the second end of the cord ring with the second connecting point is mounted into the second receiving space of the double hook, and is specifically held there by means of the one or more elements provided there fixing device so as to be secured against slippage in the cord direction.

In one refinement, the receiving portion has, at least on one, preferably on both, end side(s) with respect to its longitudinal extent, a cover element which delimits the associated receiving space in an upward direction. The cover element forms a type of lid which prevents an inadvertent dismounting of the cord ring, wherein the cover element at least partially covers the fixing device. Here, the cover element may in particular cover the ridge-like projection that may be provided on the receiving portion.

A further aspect of the present invention which achieves the above object on its own but which can be combined particularly advantageously with the other aspects of the present invention, relates to a cord ring for a trampoline tensioning arrangement, in particular for a cord hook according to the present invention, wherein at least one, preferably all, cord ring(s) is/are formed i) from a first cord piece, which has a first and a second end portion, wherein the first end portion and the second end portion are connected to one another and form a connecting point; or ii) from a first cord piece with a first and a second end portion and from a second cord piece with a first and a second end portion, wherein the first end portion of the first cord piece is connected, forming a connecting point, to the second end portion of the second cord piece, and wherein the second end portion of the first cord piece is connected, forming a further connecting point, to the first end portion of the second cord piece;

wherein, furthermore, the connecting point is formed with a connecting element. Said connecting element may be in particular a bracket or an element of similar action; it is also possible for the two respective cord portions to be fixed to one another by means of a materially integral connection or some other connection. The first and second end portions are in this case fixed to one another in each case at the corresponding connecting point such that their free ends fixed to one another are arranged on the same side of the connecting point in relation to a longitudinal direction of the first and second end portions. The free ends thus point in the same direction. A cord ring of said type is particularly advantageous, because the connecting point, owing to its form, offers a natural action point for the fixing device according to an aspect of the present invention. It is however also conceivable for the cord hook according to the invention to be used with a cord ring which has at least one connecting point, wherein the free ends of the two connected end portions point in opposite directions. The cord ring may thus, at the at least one connecting point, have end portions directed oppositely or in the same direction. It is also conceivable to use a cord ring with connecting points of both types.

In a further aspect which achieves the above object on its own but which can be combined particularly advantageously with the other aspects of the present invention, the present invention relates to a securing system for securing a jump mat to a trampoline frame, having a multiplicity of cord hooks and a multiplicity of preferably elastic cord rings, wherein the cord hooks are preferably designed according to the invention, as described herein, and/or the cord rings are preferably designed according to the invention, as described herein.

In a preferred embodiment, the securing system comprises an equal number of cord hooks and cord rings. Here, the cord hooks may in particular be designed such that two or more flexible band elements which are secured to the jump mat, for example are sewn to the jump mat, and form a loop can be connected to each cord hook, in order for these to be secured exchangeably, and after the securing of the band elements to the jump mat.

A further aspect of the present invention which achieves the above object on its own but which can be combined particularly advantageously with the other aspects of the present invention relates to a trampoline, in particular a mini trampoline, comprising a trampoline frame, a securing system according to an aspect of the present invention, and a jump mat, wherein the cord rings are each tensioned or mounted in the cord hooks such that at least one, preferably all, of the connecting points are supported by the fixing device against slippage in the cord direction.

The present invention also relates to the use of a cord hook according to the present invention and/or of a cord ring according to the present invention or to the use of a securing system according to the present invention for connecting a jump mat to a trampoline frame.

A further aspect which achieves the above object on its own but which can be combined particularly advantageously with the other aspects of the present invention relates to a method for securing a jump mat to a trampoline frame, having the steps:

i) providing a securing system according to the present invention;

ii) looping the cord ring around a frame portion of the trampoline frame and mounting a first and a second end of the cord ring into at least one receiving space of the cord hook in order to tension the jump mat in the trampoline frame.

In one refinement of this method, the cord hooks are designed according to the present invention, wherein the cord hooks are, before the mounting of the cord ring and after the securing of the band elements to the jump mat, mounted into the at least one associated band element. In a yet further refinement, the cord rings are likewise designed according to the present invention, wherein the at least one connecting point of the cord ring is held so as to be secured against movement in the cord direction by means of the fixing device in the receiving space in which it is mounted.

The cord hooks are preferably secured in each case by means of one, two or more preferably flexible, preferably non-elastic band elements to the jump mat. Here, the band elements have preferably already been connected to the jump mat at the time at which the cord hook is mounted.

The cord hook is preferably produced from plastic, for example be an injection-molded part or a 3D-printed product. In particular, the cord hook may be formed in one piece.

The securing portion may be formed as a shackle with a slot, as presented in EP 2 540 352, wherein a band element is looped through said slot.

According to a further aspect of the present invention, which, like all of the aspects mentioned, likewise achieves the above-stated object on its own, and which can be combined particularly advantageously with the other aspects, but like the other aspects may also be implemented independently of other aspects, the securing portion is preferably designed such that the at least one band element, preferably the two band elements, can be mounted (and correspondingly dismounted again). This yields the advantages that the cord hook is firstly exchangeable, that is to say, in the event of a defect, a straightforward remedy is possible, and secondly, there is the production advantage that, in the production process, the cord hooks do not have to be secured to the jump mat already during the sewing or securing of the band elements. If one considers specifically the securing technology proposed in EP 2 540 352, the cord hook is fixedly sewn to the jump mat by the band element and, as such, is not exchangeable. Furthermore, in the production of the securing means according to EP 2 540 352, there is the disadvantage that the produced mats which have not yet been mounted cannot be easily stacked, because the cord hooks have already been secured. With the securing portions designed for the mounting, it is however possible for the cord hooks to be mounted both into the cord ring and into the flexible band element, whereby each cord hook is thus exchangeable and, in the production process, has to be mounted only during the definitive tensioning of the jump mat with the trampoline frame. It is correspondingly self-evidently conceivable for a securing portion of said type designed for the mounting to also be combined with the cord hook from EP 2 540 352, that is to say for the slotted shackle to be omitted there and for the securing portion to be used for the mounting, as described herein.

The present invention thus relates, in this aspect, to a cord hook, preferably but not imperatively a cord hook having a fixing device according to the invention, for the tensioning arrangement of a trampoline, according to the preamble of claim 1, wherein the securing portion has at least one hook element for the mounting of a band element, preferably two hook elements for the mounting of two band elements. It is preferable, if two hook elements are provided, for said hook elements to be either inwardly open or outwardly open.

This aspect is based on the realization that, by means of hook elements provided on the securing element for the band elements, a detachability of the cord hooks from the band elements and thus from the jump mat is provided.

It is preferable for the at least one hook element, in particular the exactly two hook elements, of the cord hook to be delimited on one side by the transition portion. It is preferable for any possible lateral guide elements to be arranged so as to extend, in the delimiting portion of the transition portion, perpendicularly away from the transition portion and thus additionally delimit the corresponding hook element inward, that is to say toward the transition portion. The hook element and the one or more corresponding lateral guide elements, or more generally the fixing device, then correspondingly overlap.

It is preferable for the securing portion to be of flat form. This permits simple mounting and ensures the required stability.

In the case of a double hook construction, the securing portion preferably lies in the plane of the transition portion. It is preferable, when the cord hook is tensioned with two hook elements, for the two corresponding band elements to lie in the plane of the transition portion.

A securing portion with a streamlined cross section is particularly preferred. The securing portion cross section may thus have the shape of an airfoil profile, wherein the profile nose forms the distal edge and the profile trailing edge forms the proximal edge of the securing portion.

The distal edge of the securing portion may be formed so as to be straight or more generally so as to substantially follow the curvature of the adjoining circumference of the jump mat, such that the tension direction of the mounted band elements in the tensioned state runs perpendicular to the adjoining circumference. The distal edge may thus, in the case of a circular jump mat, substantially follow the circular arc of the adjoining circumference of the jump mat. This permits a radial orientation of the band elements with respect to the jump mat, and thus an optimum introduction of force the jump mat.

The proximal edge of the securing portion may be designed to be straight or so as to be curved with a central region in the distal direction. This convex curvature of the proximal edge permits an optimum transmission of force.

It is preferable for the at least one hook element, in particular the exactly two hook elements, to be directed toward the receiving portion. It is thus possible for the corresponding band element to be lifted toward the receiving portion and over the hook element, inward in the case of outwardly open hook elements or outward in the case of inwardly open hook elements, that is to say toward the transition portion or away from the transition portion respectively, and mounted.

In the embodiments with two hook elements, in which the hook elements are inwardly open, the openings of the hook elements are directed toward one another and the band elements can be mounted from the inside. In the embodiments in which the hook elements are outwardly open, the openings of the hook elements are directed away from one another, and the band elements can be mounted from the outside.

The receiving space of the hook element is preferably directed toward the receiving space of the receiving portion. It could also be stated that the hook portion(s) for the cord ring and the hook portion(s) for the band element(s) are directed toward one another.

What is particularly preferable is a securing portion with two hook elements, arranged at the end sides with respect to its longitudinal extent, for in each case one band element. The hook elements are preferably spaced apart such that, in the tensioned state, the tension direction of each band element and the tension directions of in each case two corresponding tension sections of the cord ring are substantially opposite (see for example FIG. 7: the right-hand band element lies substantially in the elongation of the right-hand two tension sections tapering toward one another, and the left-hand band element lies substantially in the elongation of the left-hand two tension sections tapering toward one another, of the cord ring). It is preferable for the distal edge of the transition portion and/or the securing of the band elements to the jump mat to be designed such that said tension directions of the band element and of the corresponding tension sections are as far as possible exactly opposite.

For the mounting, the band elements preferably have loops or openings or other elements, or are in particular formed directly as loops.

In a further aspect which achieves the above-stated object on its own but which can be combined particularly advantageously with the other aspects of the present invention, the present invention relates to a method in which the band elements are secured, in particular sewn, directly to the jump mat, wherein the cord hooks are then mounted into said band elements after the latter have been secured. This can be realized through the use of cord hooks which permit a mounting of the at least one band element. This is achieved through the provision of at least one of the above-described hook elements. What are particularly preferred here are embodiments in which exactly two band elements, which have preferably been connected to the jump mat in advance, are mounted on the securing portion of a cord hook. In this way, a particularly expedient tensile load distribution on the jump mat is achieved.

BRIEF DESCRIPTION OF THE DRAWINGS

Preferred embodiments of the invention will be described below on the basis of the drawings, which serve merely for explanatory purposes and are not to be interpreted as limiting. In the drawings:

FIGS. 13a,b,c show, in various views, a fourth embodiment of the cord hook according to the invention;

FIG. 14 shows, in a perspective view from a distal direction, the fourth embodiment as per FIG. 13 with tensioned cord ring and mounted band elements;

FIG. 15 shows a view of a fifth embodiment of the cord hook according to the invention;

FIG. 16 shows a perspective view from a distal direction of the subject matter as per FIG. 15;

DESCRIPTION OF PREFERRED EMBODIMENTS

Preferred embodiments will now be described on the basis of FIGS. 1 to 21. Among the various embodiments, features with identical action are denoted by the same reference designations.

Figure 1:
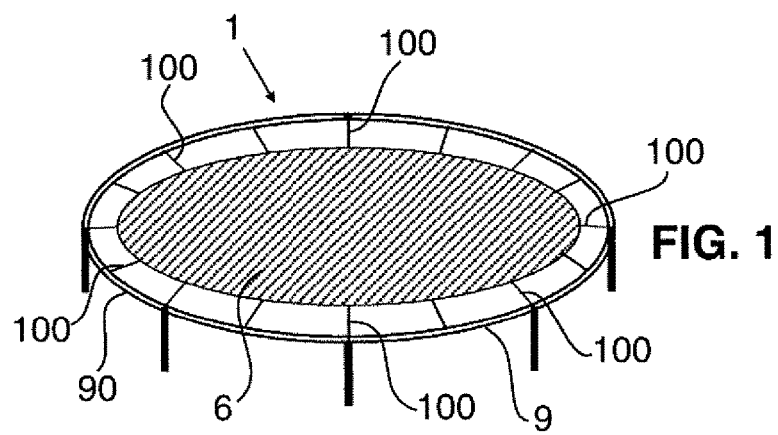
FIG. 1 shows a perspective view of a trampoline.

FIG. 1 shows a trampoline 1 with a trampoline frame 9, to which legs are secured, and having a jump mat 6, which is tensioned in the trampoline frame 9 by means of a securing system 100. The securing system 100 comprises a multiplicity of cord hooks 10, cord rings 7 and band elements 8 (see below). Here, the cord rings 7 are in each case looped around a corresponding portion 90 of the trampoline frame 9 and mounted with ends distally into a corresponding cord hook 10. The band elements 8 are each secured, in particular mounted, with one end on the proximal side of the cord hook 10, wherein the band elements 8 are each fixedly secured with the opposite end to the jump mat 6.

Securing systems 100 are basically also conceivable which make do without such band elements 8. For example, the cord hook 10 may be secured directly to the jump mat 6.

Figure 2:
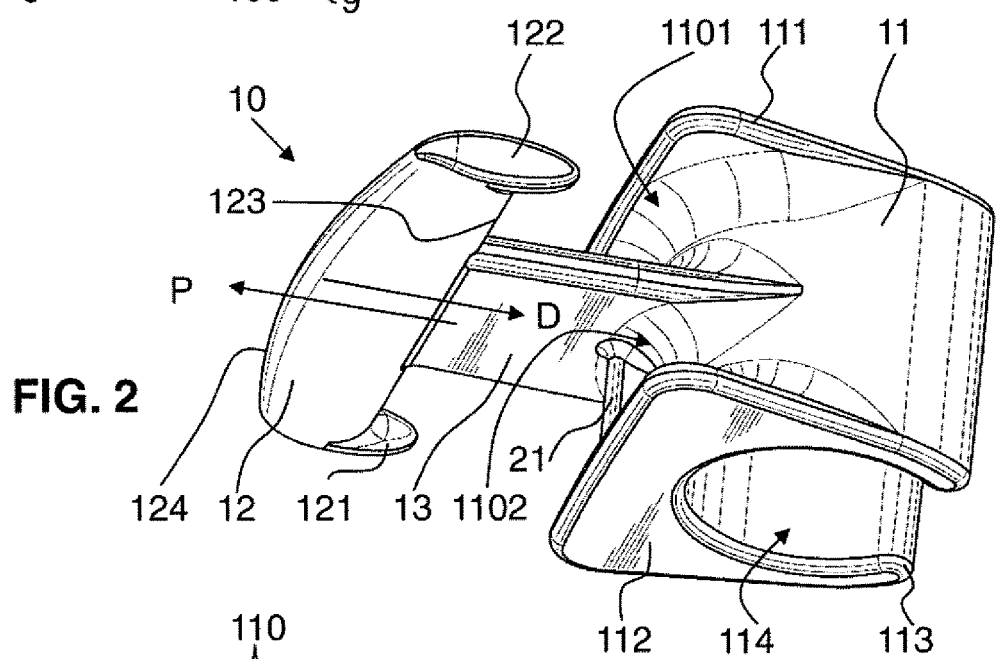
FIG. 2 shows a perspective view of a first embodiment of a cord hook according to the invention.

FIG. 2 shows a first embodiment of a cord hook 10 according to the present invention. The cord hook 10 has a receiving portion 11, a securing portion 12 and an interposed transition portion 13 which connects the receiving portion 11 and the securing portion 12. The cord hook 10 is is designed as a double hook with a first receiving space 1101 for receiving a first end 71 of the cord ring 7 and with a second receiving space 1102 for receiving a second end 72 of the cord ring 7.

The receiving portion 11 is of cylindrical design and has a circular cylindrical main body 113 with a central recess 114. In the distal region, that is to say remote from the securing portion 12, a part of the main body 113 is omitted, such that the cavity 114 is open in the distal direction D. Both the cavity and the open form in the distal direction D permit a saving of material and thus a lightweight design of the cord hook 10. A uniform wall thickness is also advantageous for injection-molded parts.

The form of a straight, hollow circular cylinder makes it possible for the first and the second receiving space 1101, 1102 to each realize optimum abutment of the first and second end 71, 72, respectively, of the cord ring 7. The first and second end 71, 72 then bears against the main body 113 in each case along a part of a circumference of a circle in the respective receiving space 1101, 1102. Here, the diameter of the main body 113 is selected such that optimum abutment is ensured with minimal introduction of stress into the cord material.

The main body 113 is, to both sides with respect to its longitudinal extent (that is to say along the cylinder axis), which for the sake of simplicity will be referred to as top and bottom in the context of the appended figures, covered by means of a first cover element 111 and a second cover element 112. In the tensioned state, individual hooks are however preferably oriented so as to be downwardly open. The lid-like cover elements 111, 112 project beyond the main body 113 in the proximal direction P, that is to say in the direction of the securing portion 12. The cover elements 111, 112 thus delimit the first and second receiving space 1101 and 1102 respectively in the upward and the downward direction respectively, and secure items that have been mounted. The cover elements 111, 112 have, in the distal region, a width which substantially corresponds to the width of the main body 113, and progressively widen in the proximal direction P. Such a widening is not imperatively necessary, and a constant width or a narrowing is likewise conceivable; the various appended figures show different refinements of the cover elements, which may be combined as desired.

Centrally with respect to the longitudinal extent of the main body 113, the transition portion 13 projects in a straight manner from the main body 113 in the proximal direction P. Here, the transition portion 13 is designed to be somewhat narrower than the outer diameter of the main body 113 at the starting point of the transition portion 13. The starting point portions of the transition portion 13 at the receiving portion 11 are preferably of rounded form. A situation in which the cord ring 7 is exposed to wear-generating edges is thus avoided. Furthermore, the transition portion 13 narrows in the proximal direction P by 5% to 20%. This also assists in saving material. The transition portion 13 is of straight and substantially plate-like form; its longitudinal extent is thus parallel to the proximal direction P.

Figure 22:
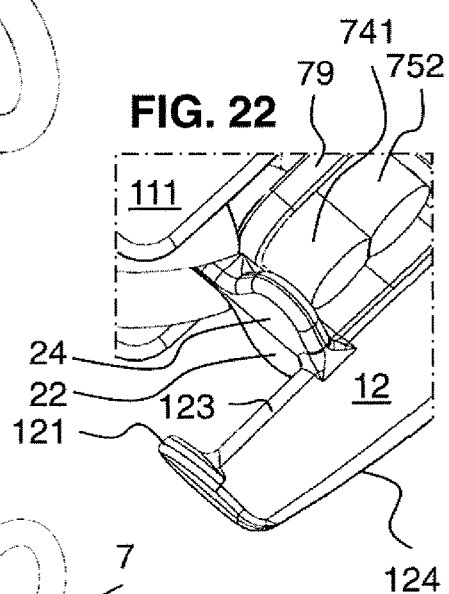
FIG. 22 shows a detail of a hook element of a cord hook as per any of FIGS. 2 to 12.

Arranged at the proximal end of the transition portion 13 is the securing portion 12, which runs perpendicular to the longitudinal extent of the main body 113 and to the longitudinal extent of the transition portion 13. The securing portion 12 is, at the end sides with respect to its longitudinal extent, equipped with a first hook element 121 and a second hook element 122 respectively. These hook elements 121, 122 are outwardly open and are closed off to the outside by means of plate elements, which are attached to the securing element 12 at the end sides with respect to the longitudinal extent and which project beyond said securing element distal direction D by 2 to 5 millimeters, in particular 3 millimeters. Here, a distance between these plate elements and the transition portion 13 running parallel, that is to say a width of a receiving space of the hook elements 121, 122, amounts to for example 10 to 20 millimeters, in particular approximately 12 millimeters. The receiving space of the hook elements 121, 122 is, at the inside, that is to say toward the transition portion 13, delimited by the transition portion 13. As shown in detail for example in FIG. 22, any possible lateral guide elements 22 to 25 (only 22 and 25 are shown) delimit said receiving space of the hook elements 121, 122 additionally perpendicularly with respect to the transition portion 13. The corresponding band element 8, which is mounted into a receiving space of a hook element 121, 122, then has a distal width of 1 to 5 millimeters, for example 2 millimeters, less than the distance between the corresponding plate element and the transition portion 13. The securing portion 12 may have a length of 45 to 55 millimeters, for example of 50 millimeters. The other dimensions for preferred embodiments can be found in the figures, which are substantially proportionally accurate illustrations. The securing portion 12 has a centrally outwardly, that is to say convexly curved proximal edge 124 (see FIGS. 2 & 22); a dimension of the securing portion 12 in the proximal direction P may, centrally, amount for example to approximately 10 millimeters and decrease towards the lateral ends by approximately 20%. The distal edge 123 (see FIGS. 2 & 22) is of straight form.

It is also conceivable for the distal edge portions in the two receiving spaces of the hook elements 121, 122 to run at an angle with respect to one another or to be of curved form, such that they substantially follow an associated circumferential portion of the jump mat 6. This permits, in particular in the case of a circular jump mat 6, a radial orientation of the band elements 8, which permits an optimum distribution of the tensile force.

Furthermore, the receiving portion 11 together with cover elements 111, 112 may be formed such that the tension forces of the two tension sections, situated on the side of a band element 8, of the cord ring 7 run substantially oppositely to the tension force of said band element 8 (see for example FIG. 7), which permits an optimum transmission of force by means of the cord hook 10.

Between the cover element 112 and the transition portion 13, that is to say in the second receiving space 1102, there is provided a projection 21 which extends from the transition portion 13 along the main body 113 as far as the cover element 112. The projection 21 is formed as a ridge which has a material thickness of 1 to 4 mm and a projection height from the main body 113 of 1 to 5 mm. In the direction of its free end, the projection 21 preferably narrows by 5 to 20%. The free end is of rounded form. In this first embodiment of the cord hook 10, the projection 21 forms the fixing device 2, which makes it possible for the cord ring 7 to be fixed with a connecting point 77 in the second receiving space 1102. Furthermore, the projection 21 has the further advantage that the cord hook 10 is structurally stabilized.

Figure 10:
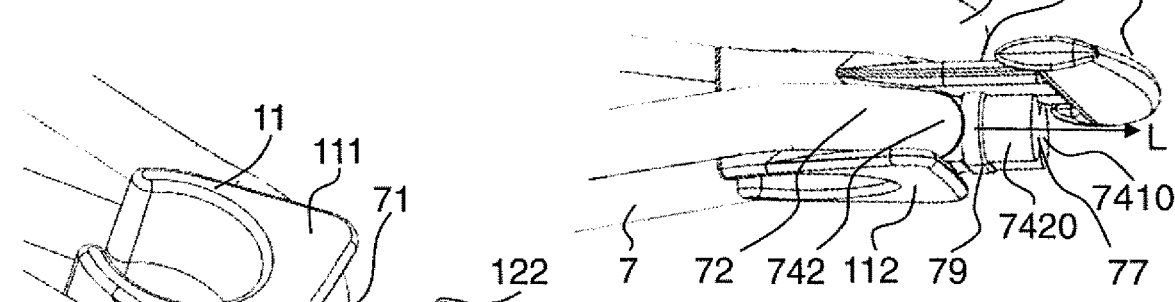
FIG. 10 shows a lateral view of the cord hook as per FIG. 2 with tensioned cord ring.
Figure 11:
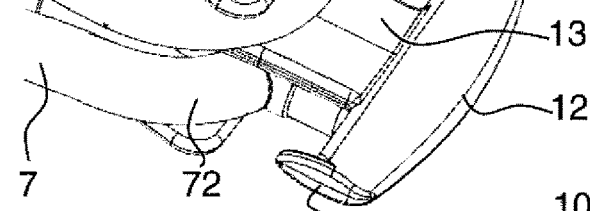
FIG. 11 shows a perspective view from above from a proximal direction of the subject matter as per FIG. 10.

FIGS. 10 and 11 show the first embodiment of the cord hook 10 as per FIG. 2 with a tensioned cord ring 7. The first end 71 of the cord ring 7 is mounted into the first receiving space 1101, and the second end 72 of the cord ring 7 is mounted into the second receiving space 1102. The cord ring 7 is produced from a single cord piece 74, wherein end portions 741, 742 of the cord piece 74 have free ends 7410, 7420. The end portions 741 and 742 are clamped together by means of a bracket 79, such that the free ends 7410 and 7420, which are arranged remote from the ring, that is to say proximally, in relation to the bracket 79 point in the same direction. The projection 21 engages in a wedge-like manner between the end portions 741, 742 from an inner side 702 of the cord ring 7 (see FIGS. 9 and 14) and thus immobilizes said end portions 741, 742 and thus the connecting point 77 in the second receiving space 1102 so as to secure these in the cord direction against displacement during intended use.

Figure 3:
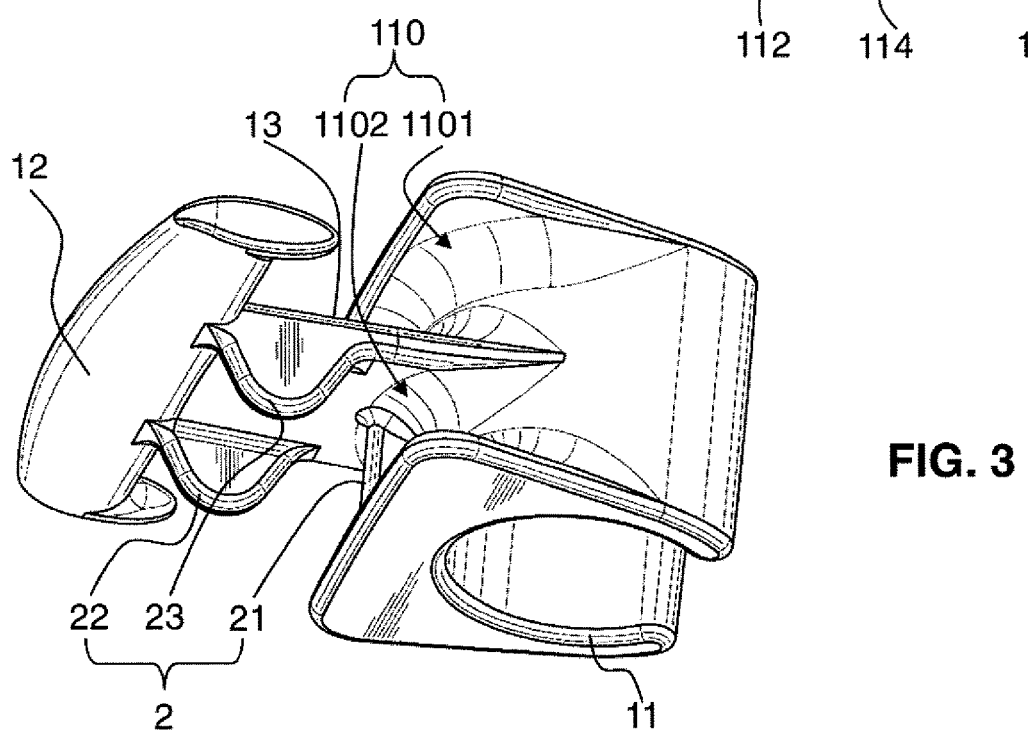
FIG. 3 shows a perspective view of a second embodiment of a cord hook according to the invention.
Figure 4:
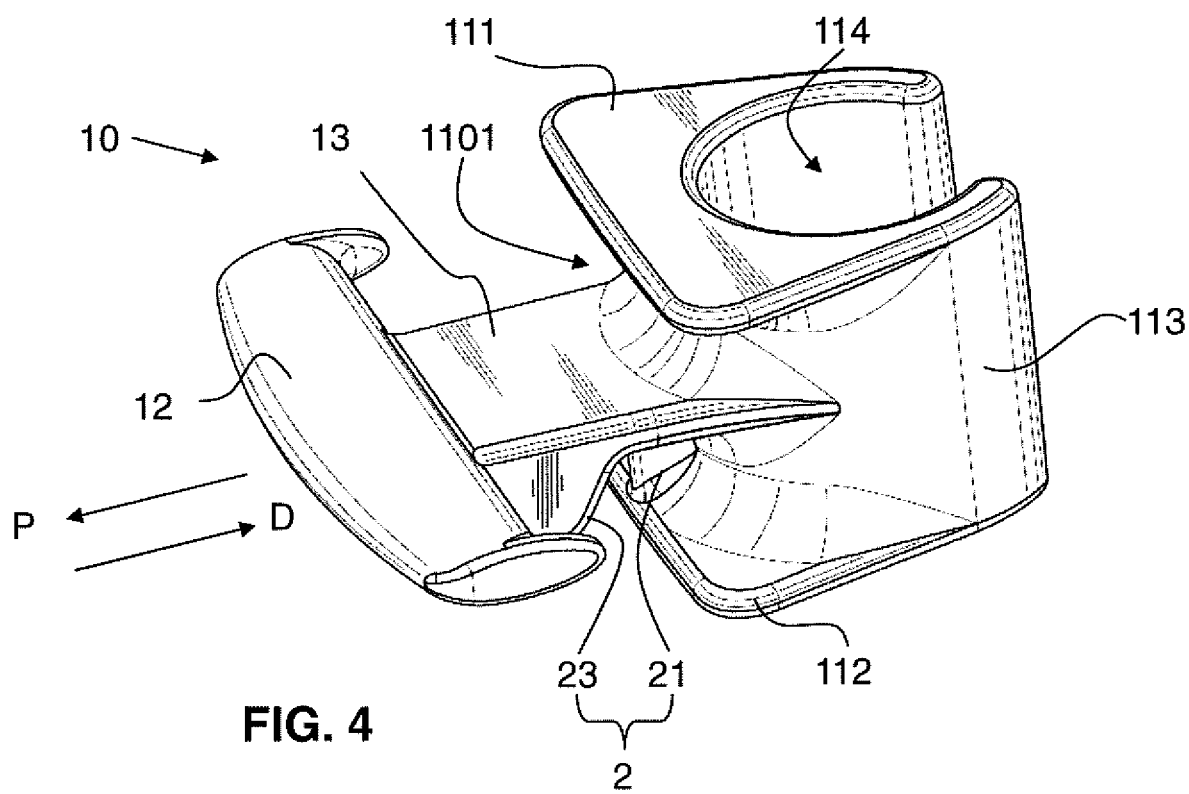
FIG. 4 shows a second perspective view of the second embodiment as per FIG. 3.
Figure 12:
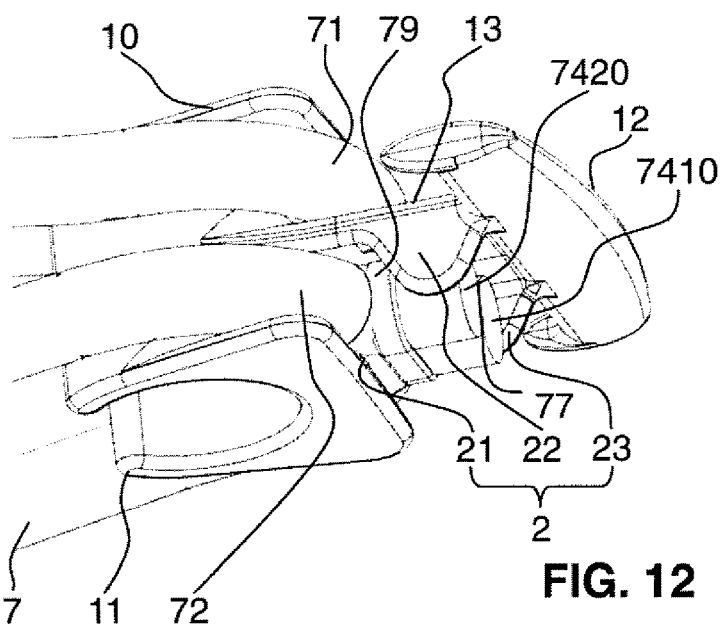
FIG. 12 shows a perspective view from proximally below the cord hook as per FIG. 3 with tensioned cord ring.

FIG. 3 and FIG. 4 show a second embodiment of the cord hook 10, which constitutes a refinement of the cord hook 10 as per FIG. 2. The second embodiment has, additionally to the projection 21, the lateral guide elements 22 and 23, which are arranged laterally in the proximal region of the transition portion 13 and which project from the transition portion 13 in the direction of the longitudinal extent of the receiving portion 11. The lateral guide elements 22, 23 are vane-like structures which extend perpendicularly away from a surface, directed towards the second receiving space 1102, of the transition portion 13. The lateral guide elements 22, 23 are furthermore of plate-like form, stand at the edge side on the transition portion 13 so as to be substantially parallel to the plate elements that form the hook elements 121, 122, and have an outer form in the shape of a Gaussian curve. The arrangement and height of the lateral guide elements 22, 23 is selected such that the free ends 7410, 7420 are, as shown in FIG. 12, fixed between the lateral guide elements 22, 23, because the lateral guide elements 22, 23 additionally fix said free ends 7110, 7420 on their outer side 701, and thus the connecting point 77, against slippage in the cord direction. Thus, the fixing device 2 is formed from the projection 21 and the lateral guide elements 22, 23. No elements of the fixing device 2 are arranged in the first receiving space 1101.

Figure 20:
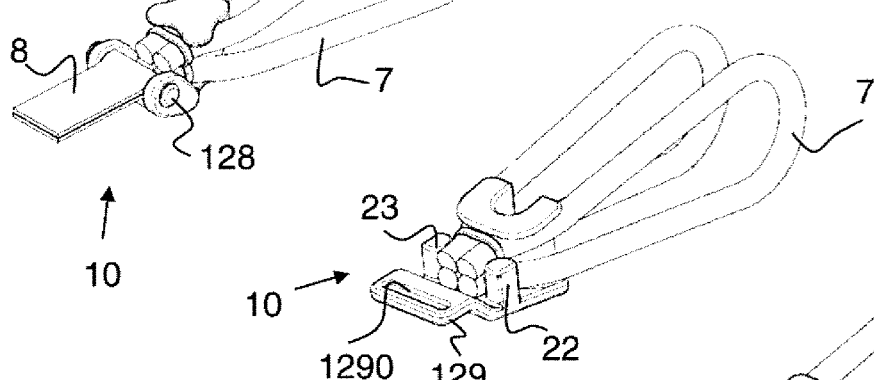
FIGS. 20,21 show yet another embodiment of the cord hook according to the invention.
Figure 21:
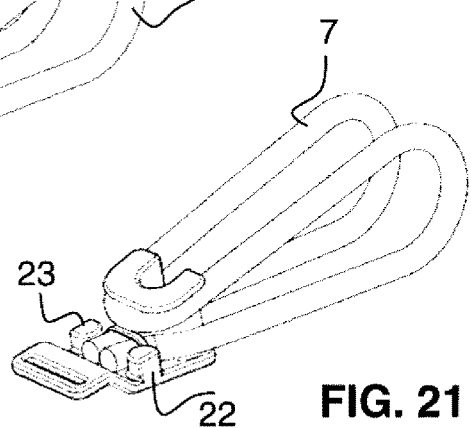

The lateral guide elements 22, 23 may also be of column-like form as shown in FIGS. 20 and 21.

An embodiment is self-evidently also conceivable (not illustrated) in which the lateral guide elements 22, 23 are provided and the projection 21 is omitted.

The first and second embodiments of the cord hook 10 are correspondingly particularly suitable for cord rings 7 which have only one connecting point 77.

Figure 5:
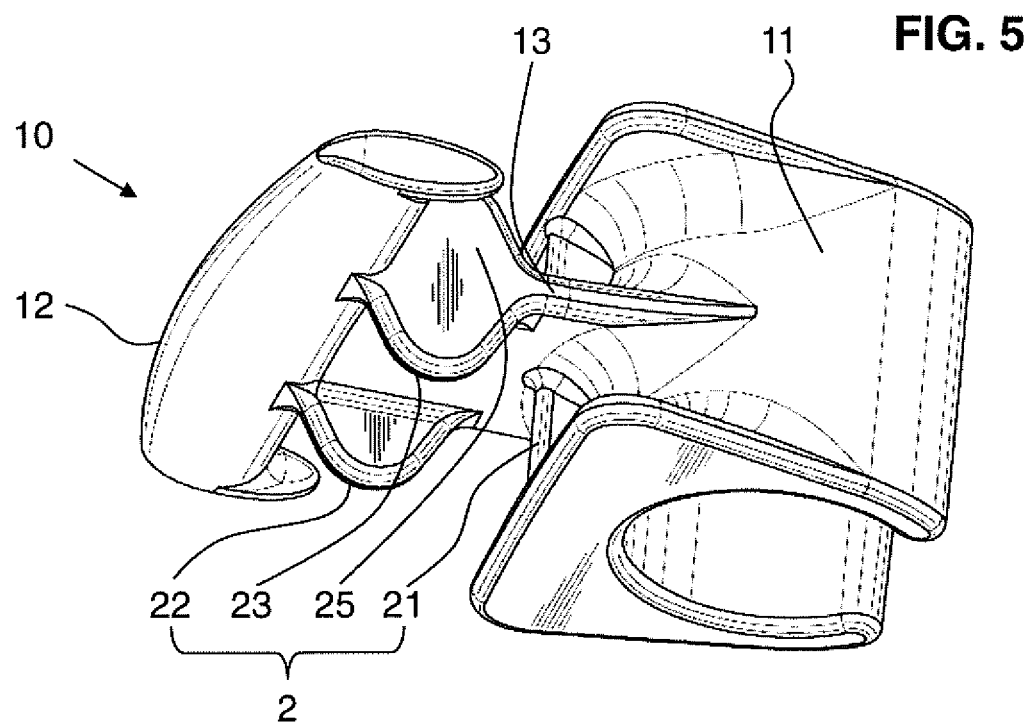
FIG. 5 shows a perspective view of a third embodiment of a cord hook according to the invention.

FIG. 5 shows a third embodiment of the cord hook 10 which constitutes a refinement of the second embodiment. In this embodiment, the fixing device 2 now not only has elements in the second receiving space 1102 but also has guide elements in the first receiving space 1101. In the embodiment illustrated, a further ridge-like projection 21 is provided in the first receiving space 1101, analogously to that in the second receiving space 1102. Moreover, further vane-like lateral guide elements 24, 25, which are of identical design to the lateral guide elements 22, 23 mentioned above, are provided in the first receiving space 1101. The further lateral guide elements 24, 25 are arranged so as to be substantially mirror-symmetrical with respect to the above-mentioned lateral guide elements 22, 23 about a plane through the transition portion 13.

The further projection 21 and the further lateral guide elements 24, 25 act in the same way as the abovementioned projection 21 and the abovementioned lateral guide elements 22, 23. Correspondingly, the third embodiment of the cord hook 10 is particularly suitable for cord rings 10 with two connecting points 76, 77.

It is self-evidently again possible for individual elements of the fixing device 2 to be omitted.

Figure 6:
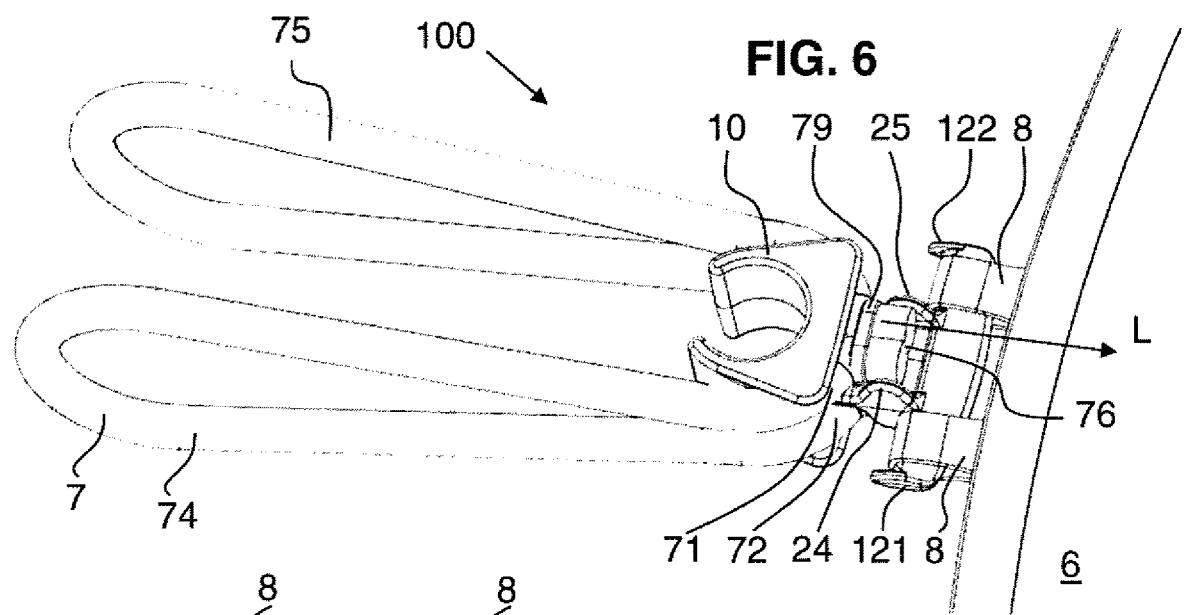
FIG. 6 shows a perspective view from above of the cord hook as per FIG. 5 with a tensioned cord ring (the trampoline frame is not shown) and with mounted band elements, which are secured to the jump mat.
Figure 7:
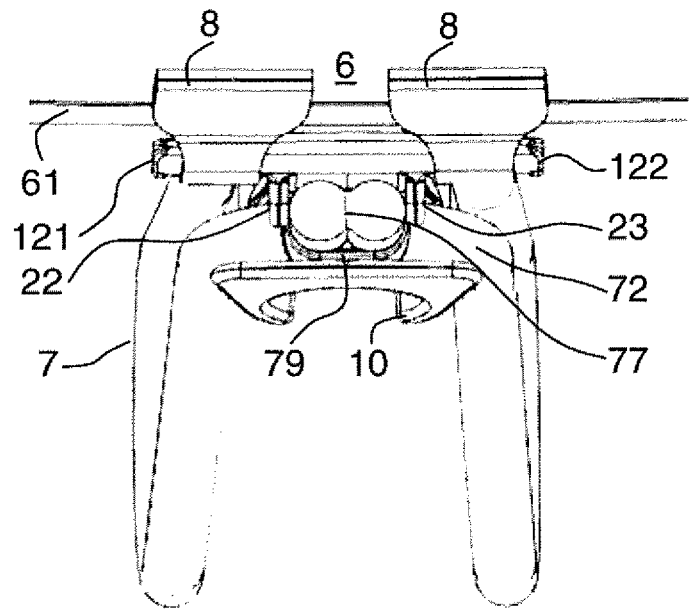
FIG. 7 shows the securing system (cord hook, cord ring, band elements) as per FIG. 6 in a proximal first perspective view from below the jump mat.
Figure 8:
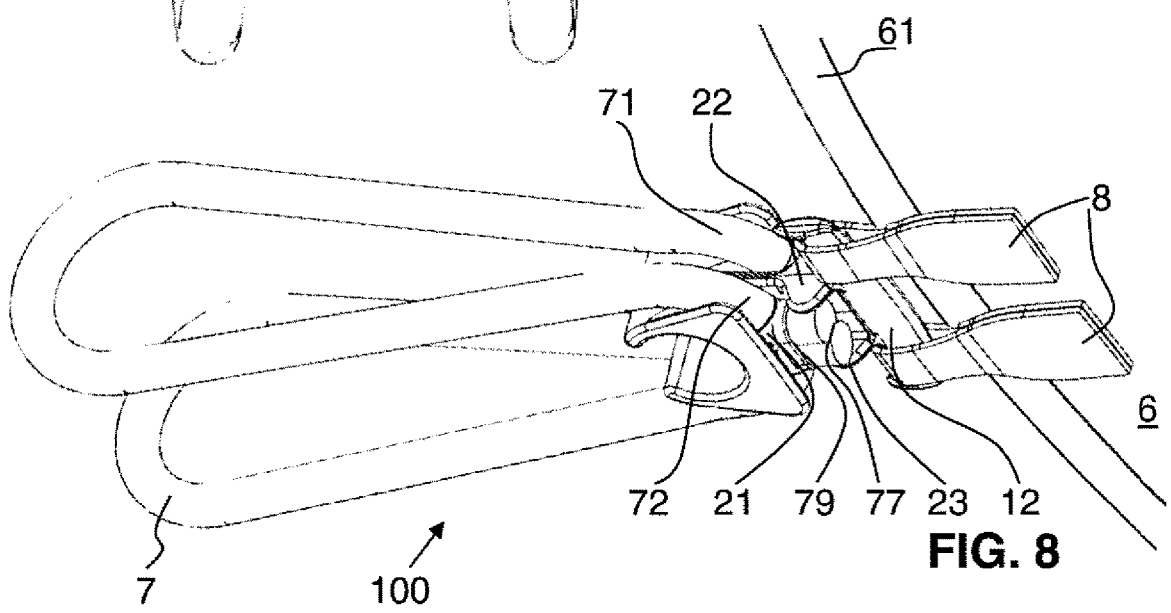
FIG. 8 shows the securing system as per FIGS. 6 and 7 in a second perspective view from below.
Figure 9:
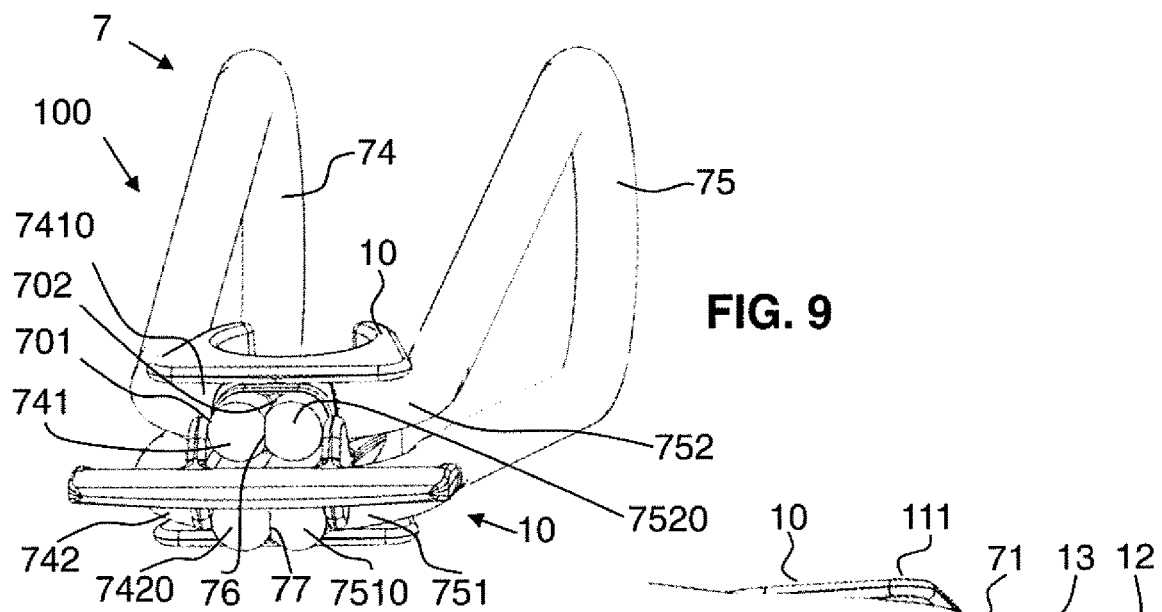
FIG. 9 shows the cord hook as per FIGS. 3, 4, 6-8 with cord ring in a tensioned state in a proximal view.

FIGS. 6 to 8 illustrate a securing system composed of a cord hook 10 according to the third embodiment, a cord ring 7 with two connecting points 76, 77, and two band elements 8, wherein the band elements 8 are secured to the jump mat 6.

The cord ring 7 has a first cord piece 74 and a second cord piece 75. The first cord piece 74 has a first end portion 741 with a first free end 7410 and has a second end portion 742 with a second free end 7420. The second cord piece 75 has a first end portion 751 with a first free end 7510 and has a second end portion 752 with a second free end 7520 (see FIG. 9). The first end portion 741 of the first cord piece 74 is connected to the second end portion 752 of the second cord piece 75 by means of a bracket 79, such that the first free end 7410 of the first cord piece 74 and the second free end 7520 of the second cord piece 75 point in the same direction, and a first connecting point 76 is formed. The second end portion 742 of the first cord piece 74 is connected to the first end portion 751 of the second cord piece 75 by means of a bracket 79 such that the second free end 7420 of the first cord piece 74 and the first free end 7510 of the second cord piece 75 point in the same direction, and a second connecting point 77 is formed. The cord ring 7 is now tensioned into the third embodiment of the cord hook 10 such that the first connecting point 76 is arranged in the first receiving space 1101 and the second connecting point 77 is arranged in the second receiving space 1102. Again, the projections 21 engage, from the inside with respect to the cord ring 7, between the respective end portions 741, 752 or 742, 751, and the lateral guide elements 22, 23 or 24, 25 engage, from the outside with respect to the cord ring 7, on the respective free ends 7410, 7520 or 7420, 7510, such that the fixing device 2 that is formed fixes the two connecting points 76 and 77 against slippage in the cord direction in the respective receiving spaces 1101, 1102.

FIGS. 6 to 8 furthermore show how the flexible band elements 8 are mounted into the hook elements 121, 122 and are secured to the jump mat 6 from below, in particular by sewing. As can be seen from FIG. 7, it is preferable for the band elements 8 to be secured to the bottom side of the jump mat 6 such that the longitudinal extent thereof runs in the radial direction with respect to the jump mat. An optimum introduction of tensile load into the jump mat 6 is thus ensured. Furthermore, the design is preferably such that the right-hand band element 8 is situated substantially in the elongation of the right-hand two tension sections, tapering toward one another, in FIG. 7, and the left-hand band element 8 is situated substantially in the elongation of the left-hand two tension sections, tapering toward one another, of the cord ring 7 in FIG. 7. In this way, the tension direction of the respective band element 8 and the associated tension sections are in each case advantageously directed oppositely. Also, the transition portion 13 and the cover elements 111, 112 are preferably oriented such that this opposite direction of the tension directions is optimal.

It is thus possible for the securing portion 12 of the cord hooks 10 according to all of the embodiments to also be of slightly angled design in the case of jump mats 6 which are circular at least in sections; the distal edge thereof may thus, in the portion in which the respective band element 8 makes contact, run perpendicular to the longitudinal extent of the band element 8. In the case of band elements 8 which run at a slight angle with respect to one another, the corresponding distal edge likewise has a corresponding angled profile of the corresponding portions.

Moreover, it can be seen for example from FIGS. 7 and 8 that the band elements 8 for all embodiments may be of widened form in the region of contact with the jump mat 6, that is to say radially at the inside in relation to an edge-encompassing band 61 of the jump mat 6 which delimits the jump mat 6 to the outside. By means of this widened form, an optimum securing is possible, for example by means of sewing and/or adhesive bonding and/or riveting and/or welding, whereas the relatively narrow design in the free end region of the band elements 8, which are mounted into the hook elements 121, 122, permits corresponding flexibility of said end regions in order to facilitate the mounting. It is self-evidently also conceivable for the band elements 8 to be secured to the jump mat 6 in a different way.

FIGS. 13a, b and c show a fourth embodiment of the cord hook 10 according to the invention, which is however designed not as a double hook but now as an individual hook with only one receiving space 110. Again, the cord hook 10 has a receiving portion 11, a securing portion 12 and a transition portion 13 which connects the receiving portion 11 from the securing portion 12. The transition portion 13 is however no longer of straight form, that is to say no longer runs in the proximal direction P from a center with respect to the longitudinal extent of the main body 113, but rather starts at the lower end of the main body 113, runs parallel to the proximal direction over approximately half of its longitudinal extent, and then, by means of a bend region, bends upward, such that the securing element 12 comes to lie approximately at the level of the center in the longitudinal direction of the main body 113. In the bending region, the lateral guide elements 22, 23 are arranged laterally on the transition portion 13. Said lateral guide elements 22, 23 are in this case no longer formed as vanes with a Gaussian curve shape or as columns, but rather run as side walls in the bend region. In terms of function, however, as in the preceding embodiments, said lateral guide elements provide lateral contact surfaces for an outer surface 701 of the free ends of the end portions of the cord ring 7 for the lateral support according to the invention. Moreover, a ridge 21 is again provided, which together with the lateral guide elements 22, 23 forms the fixing device 2. Said ridge may also be omitted or arranged on its own.

In the embodiment shown here, a cover element 111 is provided which is no longer trapezoidal, as in the embodiments described above, but rather is of rounded form. These forms are however interchangeable, and other forms are also conceivable.

FIG. 14 shows the fourth embodiment as per FIGS. 13a-c with a tensioned cord ring 7 and two mounted band elements 8. Since the projection 21 runs over the entire height of the receiving space 110, it is particularly advantageous if use is made of a cord ring 7 composed of two cord pieces 74, 75 and accordingly with two connecting points 76, 77. It is self-evidently also conceivable for the ridge 21 to be arranged only in an upper or lower half space or partial space of the receiving space 110 and for use to be made of a cord ring 7 which has only one connecting point. Furthermore, in the embodiment as per FIGS. 13 and 14, a securing element 12 is shown which has a straight proximal edge.

FIGS. 15 and 16 show a fifth embodiment of the cord hook 10 which is likewise formed as an individual hook. In this embodiment, yet another form of securing portion 12 has been selected. Furthermore, the cover element 111 no longer has the rounded or trapezoidal form of the embodiments described above, but rather has two laterally outwardly projecting, partially connected rounded disks. In the receiving space 110, there is likewise provided a projection 21 which engages provided between the end portions 741, 752 and 742, 751. Further lateral guide elements are not provided here, whereby the fixing device 2 is formed only by the projection 21. It is however conceivable for lateral guide elements to be provided.

Figure 17:
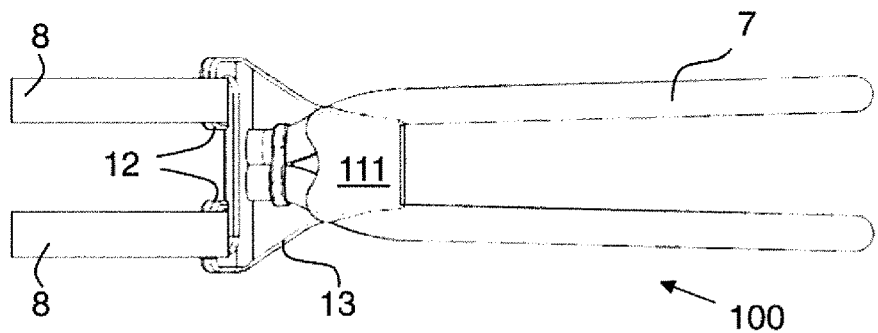
FIG. 17 shows a view of a sixth embodiment of the cord hook according to the invention with tensioned cord ring and mounted band elements.
Figure 18:
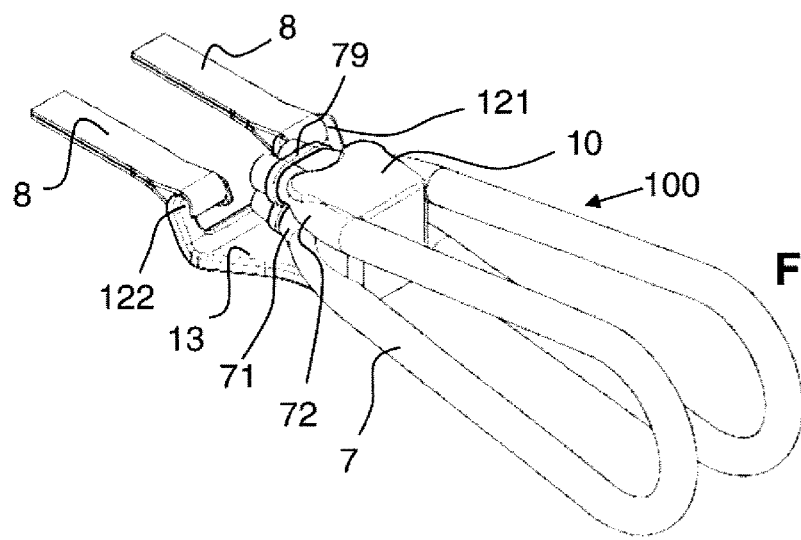
FIG. 18 shows a perspective view from a distal direction of the subject matter as per FIG. 17.

FIGS. 17 and 18 show a sixth embodiment of the cord hook 10 which differs from the fifth embodiment by the design of the securing portion 12. In all of the embodiments described above, the hook elements 121, 122 are outwardly open, that is to say the band elements 8 can be pushed from the outside over the securing portion and thus securely mounted there. In the sixth embodiment, the securing portion 12 is formed such that the hook elements 121 122 are open toward them. Such a securing portion 12 may self-evidently also be combined with the other embodiments.

Figure 19:
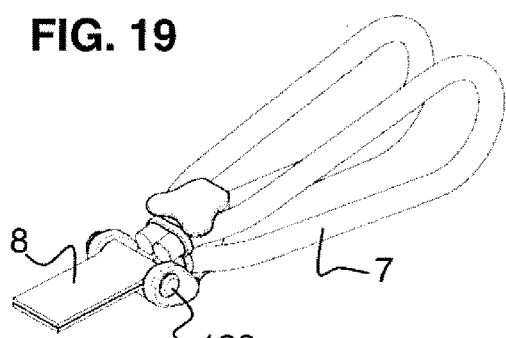
FIG. 19 shows a further embodiment of the cord hook according to the invention.

FIG. 19 shows a yet further alternatively designed securing portion 12, wherein a bolt 128 is provided which makes it possible for an already fully sewn band element 8 to be retroactively mounted into the hook 10 by virtue of the bolt 128 firstly being removed, being passed through the band element 8, and then being fixed in the hook 10 again. A projection 21 may be provided (not shown). The arms that bear the bolt 128 may be of tall design and formed as lateral guide elements, similarly to those in FIGS. 13a-c.

FIGS. 20 and 21 show alternatively designed lateral guide elements 22, 23 which are of not plate-like but column-like form. These figures also illustrate the further concept of selecting a height of the lateral guide elements 22, 23 to be only so tall that corresponding end portions can be laterally supported. If for example a cord ring 7 with two connecting points is provided (FIG. 20), the lateral guide elements 22, 23 are taller than if a cord ring 7 with only one connecting point is provided (FIG. 21). In the latter case, the end of the cord ring 7 with the connecting point should then be arranged at the bottom, as shown in FIG. 21.

Furthermore, FIGS. 20 and 21 show a securing portion 12 which is formed as a shackle 129 which is bent in portions and which has a slot 1290 at an end side.

In the embodiment as per FIG. 20, a projection 21 as described above may be provided. In FIG. 21, a projection of said type may be provided in a part of the receiving space of the individual hook in which the connecting point comes to lie.

As shown in the figures, the cover element may run parallel to the proximal direction P, in particular in the case of double hooks, or may run so as to be inclined toward the securing portion 12, in particular in the case of an individual hook (see for example FIGS. 20 and 21).

In general, the various elements of the different embodiments may be combined with one another.

As can be readily seen from the figures, all corners and edges of the cord hooks 10 are, in all illustrative embodiments, of rounded form. This reduces a risk of injury during use, and prevents the cord ring 7 from sustaining damage during use.

| LIST OF REFERENCE DESIGNATIONS | |
|---|---|
| 1 | Trampoline |
| 10 | Cord hook |
| 100 | Securing system |
| 11 | Receiving portion |
| 110 | Receiving space |
| 1101 | First receiving space |
| 1102 | Second receiving space |
| 111 | First cover element |
| 112 | Second cover element |
| 113 | Main body |
| 114 | Recess in 113 |
| 12 | Securing portion |
| 121 | First hook element of 12 |
| 122 | Second hook element of 12 |
| 123 | Distal edge of 12 |
| 124 | Proximal edge of 12 |
| 128 | Bolt |
| 129 | Shackle |
| 1290 | Slot in 129 |
| 13 | Transition portion |
| 2 | Fixing device |

-continued

LIST OF REFERENCE DESIGNATIONS

| | |
|---|---|
| 21 | Projection |
| 22 to 25 | Lateral guide element |
| 6 | Jump mat |
| 61 | Edge-encompassing band |
| 7 | Cord ring |
| 701 | Outer side of 7 |
| 702 | Inner side of 7 |
| 71 | First end of 7 |
| 72 | Second end of 7 |
| 74 | First cord piece of 7 |
| 741 | First end portion of 74 |
| 7410 | Free end of 741 |
| 742 | Second end portion of 74 |
| 7420 | Free end of 742 |
| 75 | Second cord piece of 7 |
| 751 | First end portion of 75 |
| 7510 | Free end of 751 |
| 752 | Second end portion of 75 |
| 7520 | Free end of 752 |
| 76 | Connecting point in 71 |
| 77 | Connecting point in 72 |
| 79 | Connecting element |
| 9 | Trampoline frame |
| 90 | Portion of 9 |
| 8 | Band element |
| D | Distal direction |
| L | Longitudinal direction |
| P | Proximal direction |

The invention claimed is:

1. A cord hook for use with a cord ring, which has a first connecting point, which cord ring is made of a cord piece having a first free end and a second free end, the first and second free ends being clamped together with a bracket, such that the first and second free ends point in the same direction, thus creating said first connecting point, of a trampoline tensioning arrangement, wherein the cord hook comprises:
   a distal receiving portion for receiving the cord ring;
   a proximal securing portion for securing to a jump mat of a trampoline;
   a transition portion connecting the receiving portion and the securing portion;
   a receiving space provided in the distal receiving portion for the mounting of the first connection point of the cord ring; and
   a fixing device which is designed, during the intended use of the cord hook, to hold the first connecting point of the cord ring so as to prevent slippage in a cord direction,
   wherein the fixing device has a first projection which is attached to the receiving portion and which projects into the receiving space and which is designed and arranged so as to engage into the first connecting point from within the cord ring.

2. The cord hook according to claim 1, wherein the cord ring includes a second connecting point, wherein the receiving space comprises a first receiving area for the mounting of the first connection point of the cord ring and a second receiving area for the mounting of the second connection point of the cord ring, wherein the fixing device is designed, during the intended use of the cord hook, to also hold the second connecting point of the cord ring so as to prevent slippage in a cord direction.

3. The cord hook as claimed in claim 2, which is formed as an individual hook and which comprises the first and the second individual receiving area for the joint mounting of the first connecting point of the cord ring and of the second connecting point of the cord ring.

4. The cord hook as claimed in claim 2, which is formed as a double hook and which comprises the first receiving area for the mounting of the first connecting point of the cord loop and the second receiving area for the mounting of the second connecting point of the cord ring, wherein the first receiving area and the second receiving area are separated from one another by the transition portion.

5. The cord hook as claimed in claim 4, wherein the transition portion is of straight form.

6. The cord hook as claimed in claim 4, wherein the fixing device is arranged only in the first receiving area or in the second receiving area of the double hook, or assigned only thereto.

7. The cord hook as claimed in claim 4, wherein the fixing device is arranged both in the first receiving area and in the second receiving area of the double hook, or assigned thereto.

8. The cord hook as claimed in claim 1, wherein the fixing device makes contact with the cord ring in the region of the first connecting point on an outer side of the cord ring.

9. The cord hook as claimed in claim 1, wherein the fixing device makes contact with the cord ring in the region of the first connecting point on an inner side of the cord ring.

10. The cord hook as claimed in claim 1, wherein the first projection projects in the direction of the transition portion from the receiving portion.

11. The cord hook as claimed in claim 1, wherein the securing portion has, in the distal direction, one, two or more open hook elements for the mounting of in each case one band element for the purposes of securing to the jump mat, which preferably partially overlap with the fixing device.

12. The cord hook as claimed in claim 1, wherein the receiving portion has at least one cover element, wherein the cover element preferably at least partially covers the fixing device.

13. A cord hook for a cord ring, which has a first connecting point, which cord ring is made of a cord piece having a first free end and a second free end, the first and second free ends being clamped together with a bracket, such that the first and second free ends point in the same direction, thus creating said first connecting point, of a trampoline tensioning arrangement, wherein the cord hook comprises,
   a distal receiving portion for receiving the cord ring;
   a proximal securing portion for securing to a lump mat of a trampoline;
   a transition portion connecting the receiving portion and the securing portion;
   a receiving space provided in the distal receiving portion for the mounting of the first connection point of the cord ring; and
   a fixing device which is designed, during the intended use of the cord hook, to hold the first connecting point of the cord ring so as to prevent slippage in a cord direction, wherein the fixing device comprises two lateral guide elements which are attached to the transition portion in a proximal direction and which make contact with the first connecting point from outside the cord ring, wherein each lateral guide element directly adjoins the securing portion, wherein the two lateral guide elements enclose the first connecting point of the cord ring on both sides in the cord direction.

14. A cord ring for a trampoline tensioning arrangement, formed from a first cord piece, which has a first and a second end portion, wherein the first end portion and the second end portion are connected to one another and form a first connecting point, wherein the connecting point is formed with a connecting element, wherein the connecting element includes a bracket, wherein the first and second end portions are inseparably clamped to one another at the corresponding connecting point with said bracket such that their free ends fixed to one another are arranged on the same side of the connecting point in relation to a longitudinal direction of the first and second end portions.

15. The cord ring according to claim 14, wherein the cord ring comprises a second cord piece with a further first and a further second end portion, wherein the first end portion of the first cord piece is connected, forming the first connecting point, to the further second end portion of the second cord piece, and wherein the second end portion of the first cord piece is connected and inseparably clamped with a second bracket, forming a second connecting point, to the further first end portion of the second cord piece.

* * * * *